United States Patent [19]

Ohtsuka et al.

[11] Patent Number: 5,436,092
[45] Date of Patent: Jul. 25, 1995

[54] NON-AQUEOUS SECONDARY LIQUID BATTERY

[75] Inventors: Kiyoto Ohtsuka, Takatsuki; Toshiyuki Ohsawa, Kawasaki; Toshiyuki Kabata, Machida; Shushi Nishimura, Okayama, all of Japan

[73] Assignees: Ricoh Company, Ltd., Tokyo; Kuraray Co., Ltd., Kurashiki, both of Japan

[21] Appl. No.: 40,607

[22] Filed: Mar. 31, 1993

[30] Foreign Application Priority Data

Mar. 31, 1992 [JP] Japan .................. 4-103943
Mar. 31, 1992 [JP] Japan .................. 4-103944

[51] Int. Cl.⁶ ............................... H01M 4/36
[52] U.S. Cl. ........................... 429/194; 429/218
[58] Field of Search ........................ 429/218, 194

[56] References Cited

U.S. PATENT DOCUMENTS

| | | | |
|---|---|---|---|
| 4,725,422 | 2/1988 | Miyabayashi et al. | 429/218 X |
| 4,980,250 | 12/1990 | Takahashi et al. | 429/218 X |
| 5,153,082 | 10/1992 | Ogino et al. | 429/218 X |
| 5,187,035 | 2/1993 | Miyabayashi et al. | 429/194 X |
| 5,238,760 | 8/1993 | Takahashi et al. | 429/218 X |

*Primary Examiner*—Stephen Kalafut
*Attorney, Agent, or Firm*—Oblon, Spivak, McClelland, Maier, & Neustadt

[57] ABSTRACT

A non-aqueous secondary battery using a non-aqueous electrolyte containing an alkali metal salt dissolved as an electrolyte in an organic polar solvent, includes a negative electrode which is composed of a carbon material with a graphite-like crystalline structure parameter $Ip(002)/Io(002)$ at a diffraction peak at the (002) plane of an X-ray diffraction intensity curve being in the range of 0.7 to 0.95 and with a graphite-like crystalline structure parameter $Ip(10)/Io(10)$ at a diffraction peak at the (10) plane of an X-ray diffraction intensity curve being 0.6 or less.

10 Claims, 1 Drawing Sheet

NON-AQUEOUS SECONDARY LIQUID BATTERY

BACKGROUND OF THE INVENTION

1. Field of the Invention

This invention relates to a non-aqueous secondary battery, and more particularly to a non-aqueous secondary battery with an improved negative electrode, which has a high energy density, a long charging and discharging cycle life, and good storage stability.

2. Discussion of Background

A lithium secondary battery is expected to be utilized not only as an electric source for portable electronic machines, but also as a high-powered battery for use in electric cars and as an electric power storage device because it has the highest theoretical electromotive force and a high theoretical energy density. However, it appears that no prototype lithium secondary batteries so far announced make the best use of the properties inherent in lithium secondary battery. Moreover, the life span, performance, and energy density of such prototype lithium secondary batteries are not sufficient for practical use. It is considered that one of the most important reasons for these shortcomings is that the performance of the negative electrode is poor.

There are two problems in the practical use of the negative electrode for the lithium secondary battery:

(1) The properties of a negative electrode made of lithium metal are changed while in contact with a solvent because of the high reactivity of the lithium metal. As a result, a repeated use of the lithium secondary battery reduces a battery capacity and shortens a cycle life thereof; and (2) Lithium metal, which is deposited on the negative electrode of lithium metal by the reduction of a lithium ion in the course of charging, easily turns into needle dendrite, destroying an insulating layer (separator) between the positive electrode and the negative electrode, thus easily causing a short circuit. This leads to the shortening of the cycle life and to the instability of the lithium secondary battery.

In order to solve the above-mentioned problems, there is proposed the use of intercalation compounds, as an active material for the negative electrode, which can incorporate therein metallic lithium or the lithium ion produced while in use. Of such intercalation compounds available at present, Li-GIC (Graphite Intercalation Compound) containing graphite as a host material shows the lowest negative-electrode-reaction electric potential. It is attempted to utilize as such host materials various kinds of carbon materials such as a pyrolytic graphite, and coke in any form, such as a fibrous form or a pulverized form.

It has been suggested that the carbon material generally has a polycrystalline structure, and that (i) crystallite size and shape, (ii) the condition of a crystallite surface, and (iii) the conformation of the crystallites, vary depending on the kinds of the carbon materials. It is difficult to discuss the interrelation between the above-mentioned three conditions for the carbon material and the electrode performance without taking account of the differences in the kinds of the carbon materials. Moreover, no specific principles for the development of the carbon material used in the electrode have been made clear. A negative electrode for use in the lithium secondary battery, which satisfies all conditions for the cycle life, reaction potential, and discharge capacity, has not been developed yet.

There is also proposed that a natural material such as a pitch coke is employed as the negative electrode for use in the lithium secondary battery. However, a lithium secondary battery using such a negative electrode is unstable in performance when repeatedly used, and has not yet been used in practice.

SUMMARY OF THE INVENTION

Accordingly, an object of the present invention is to provide a lithium battery, which can solve the above-mentioned problems, and has a high degree of stability, a long cycle life, a high and a high energy density.

The above object of the present invention can be attained by a non-aqueous secondary battery using a non-aqueous electrolytic solution comprising a lithium salt dissolved as an electrolyte in an organic polar solvent, and comprising a negative electrode which comprises a carbon material with a graphite-like crystalline structure parameter $Ip(002)/Io(002)$ at a diffraction peak at the (002) plane of an X-ray diffraction intensity curve being in the range of 0.7 to 0.95, and with a graphite-like crystalline structure parameter $Ip(10)/Io(10)$ at a diffraction peak at the (10) plane of an X-ray diffraction intensity curve being 0.6 or less.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
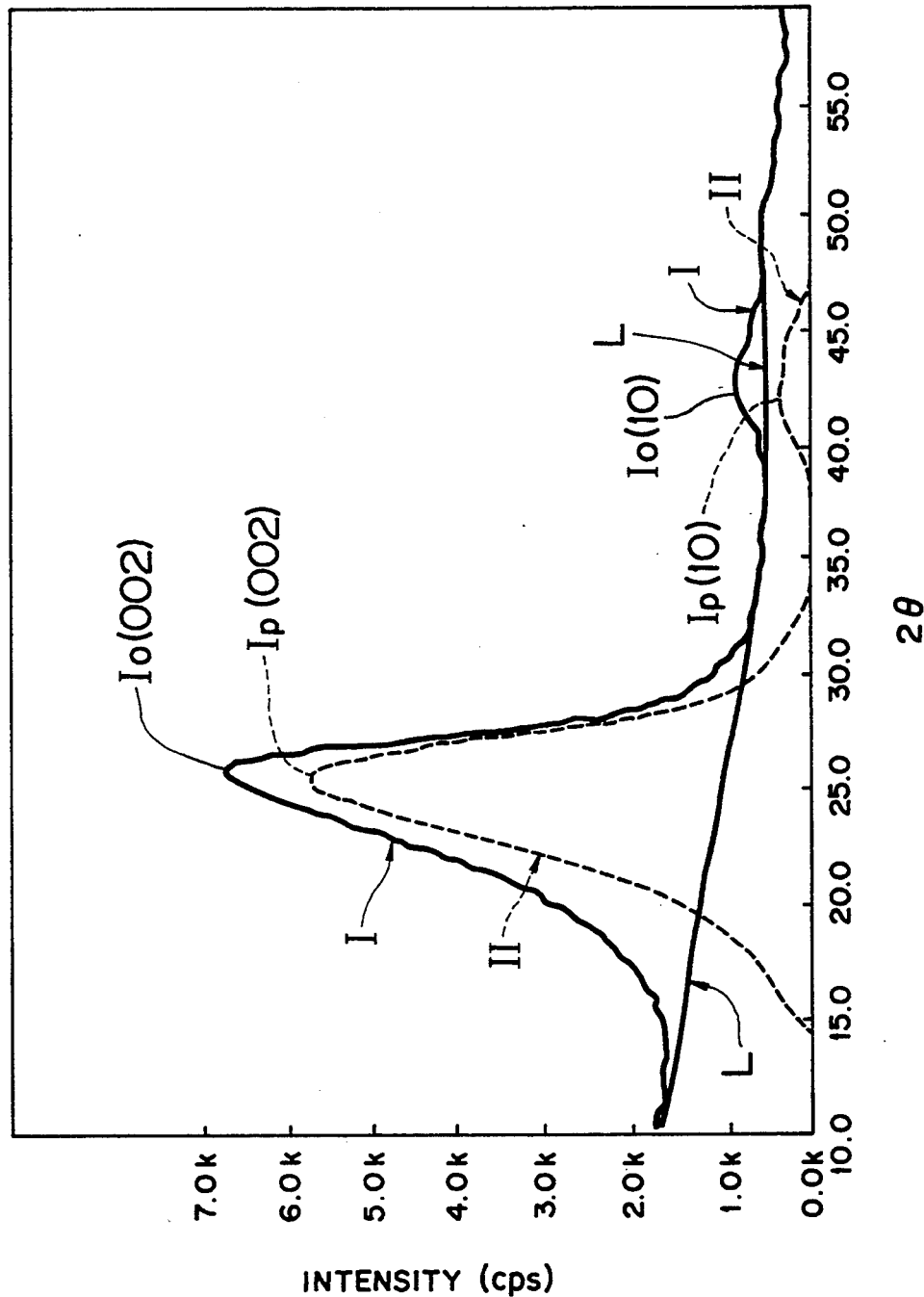
FIG. 1 is a graph in explanation of an X-ray diffraction intensity curve of a carbon material, and a method for obtaining the values of $Ip(002)/Io(002)$ thereof and $Ip(10)/Io(10)$, which are calculated from the X-ray diffraction intensity curve.

The present invention is based on the discovery that in a negative electrode comprising a carbon material, the crystallizability of the carbon material has a significant effect on the performance of the negative electrode.

In the present invention, the crystallizability of the carbon material is indicated by a graphite-like crystalline structure parameter. More specifically, the carbon material for the negative electrode of the battery of the present invention has a graphite-like crystalline structure parameter $Ip(002)/Io(002)$ at a diffraction peak at the (002) plane of an X-ray diffraction intensity curve in the range of 0.7 to 0.95, and a graphite-like crystalline structure parameter $Ip(10)/Io(10)$ at a diffraction peak at the (10) plane of an X-ray diffraction intensity curve of 0.6 or less.

The calculation of the graphite-like crystalline structure parameter $Ip(002)/Io(002)$ used in the present invention will now be explained with reference to FIG. 1.

This figure illustrates the calculation of the graphite-like crystalline structure parameter of a carbon fiber obtained by subjecting a 100% mesophase pitch to melt spinning, making the melt-spun pitch infusible at 300° C., and carbonizing the resultant material at 1000° C. The graphite-like crystalline structure parameter of other carbon materials can also be measured in the same manner as that of the above carbon fiber.

In FIG. 1, a curve I indicated by the full line represents an X-ray diffraction intensity curve (CuK$\alpha$ line) of the above-mentioned carbon fiber (carbon material) measured at the (002) plane, with X-ray diffraction intensity as ordinate, and diffraction angle ($2\theta$) as abscissa.

A tangent line L is drawn between the two opposite lowermost ends of the above-mentioned curve I. The differences in the distance in the direction of the ordinate are plotted, so that a curve II indicated by the broken line is obtained. A diffraction peak indicated by Ip(002), which is the maximum X-ray diffraction intensity on the curve II, can be determined from FIG. 1. Then, a diffraction angle $2\theta$ corresponding to the above diffraction peak Ip(002), and the X-ray diffraction intensity on the curve I corresponding to the diffraction angle $2\theta$ is determined from the graph. An air scattering intensity is subtracted from the above obtained X-ray diffraction intensity on the curve I, so that a diffraction peak indicated by Io(002), which is the maximum X-ray diffraction intensity on the curve I, is obtained. The graphite-like crystalline structure parameter Ip(002)/Io(002) is calculated from the above obtained Ip(002) and Io(002).

The above-mentioned air scattering intensity is measured in the same manner as the X-ray diffraction intensity of the carbon material except that no sample is used for scanning. The above-mentioned Ip(002) is a peak of the X-ray diffraction attributed to the graphite-like crystalline structure of the carbon material. A value of [Io(002)−Ip(002)] corresponds to the intensity of X-ray scattering resulting from a non-crystalline structure of the carbon material.

Generally, the larger the crystallite size and crystallinity of the carbon material, the higher the X-ray diffraction peak thereof. Therefore, the X-ray diffraction peak indicates the degree of crystallization. The crystallite size is determined by the sharpness of the X-ray diffraction peak. The crystallinity is usually represented by the ratio of total crystalline scattering intensity/total scattering intensity, and indicates the volume fraction of crystals in the total volume exposed to an X-ray.

However, the structure of the carbon material is not clearly divided into a crystalline portion and a noncrystalline portion. When the carbon material is regarded as a texture, Ip indicates coherent scattering from the graphite-like crystalline portion in the texture; and (Io−Ip), non-coherent scattering from the non-crystalline portion thereof.

In addition, an X-ray diffraction intensity curve parameter Ip(10)/Io(10) can also be calculated in the same manner as mentioned above. More specifically an X-ray diffraction peak Ip(10) is obtained from an X-ray diffraction intensity curve (CuK$\alpha$ line) of the carbon fiber (carbon material) measured at the (10) plane. Further, Io(10) is calculated from the above obtained Ip(10). In FIG. 1, the height of the X-ray diffraction peak of the graphite-like crystalline structure of the carbon material on the X-ray diffraction intensity curve at the (10) plane indicates the crystallinity at the (10) crystal plane, which is related to aromatic fused rings in the crystals. A half width of the X-ray diffraction intensity curve indicates the crystallite size at the (10) crystal plane.

In the present invention, the diffraction peak on the X-ray diffraction intensity curve at the (10) plane represents a combined diffraction peak of diffraction peaks on the X-ray diffraction intensity curve both at the (100) plane and the (101) plane. This is because the diffraction peak at the (10) plane, which ranges from 41° to 46° in terms of $2\theta$, is difficult to be separated into the diffraction peak at the (100) plane and the diffraction peak at the (101) plane. Therefore, in the present invention, the diffraction peak at the (10) plane is treated as a combination of the diffraction peaks both at the (100) plane and at the (101) plane.

There is no clear interrelation between the crystallinity and the crystallite size obtained from the X-ray diffraction peaks at the (002) plane and at the (10) plane. However, as the values of Ip(002)/Io(002) becomes larger, the value of Ip(10)/Io(10) also generally tends to become larger.

In the present invention, the values of the parameters Ip(002)/Io(002) and Ip(10)/Io(10), obtained from the X-ray diffraction intensity curve, both represent the degree of development of the graphite-like crystalline structure of the carbon material. The value of Ip(002)/Io(002) of sufficiently grown graphite crystals which are in a nearly complete crystalline form is more than 0.95, and the value of Ip(10)/Io(10) thereof is 0.90 or more.

The value of Ip(002)/Io(002) of a carbon material for use in a conventionally known non-aqueous secondary battery using a lithium salt is more than 0.7, and the value of Ip(10)/Io(10) thereof is more than 0.6.

On the other hand, the value of Ip(002)/Io(002) of the carbon material for use in the battery of the present invention is in the range of 0.7 to 0.95, and the value of Ip(10)/Io(10) thereof is 0.6 or less. Therefore, the crystalline structure of the carbon material is not completely developed at the (10) crystal plane. In view of the battery capacity and stability of the charging and discharging efficiency, it is preferable that the value of Ip(002)/Io(002) be in the range of 0.75 to 0.90.

In addition to the above-mentioned parameters Ip(002)/Io(002) and Ip(10)/Io(10), the interplanar spacing [d(002)] at the (002) plane and the crystallite size (Lc) in the direction of C-axis are also important parameters which indicate the crystalline structure of the carbon material. Considering the battery capacity and the stability of the charging and discharging efficiency, it is preferable that the carbon material for use in the battery of the present invention have an interplanar spacing [d(002)] at the (002) plane of 3.40 Å or more, and a crystallite size [Lc(002)] in the direction of C-axis of 100 Å or less. It is more preferable that the [d(002)] be in the range of 3.42 Å to 3.70 Å, and the [Lc(002)] be 70 Å or less, most preferably in the range of 10 Å to 70 Å.

In the present invention, the [Lc(002)] is calculated from a half width of the X-ray diffraction intensity curve at the (002) plane.

When the crystallite size [Lc(002)] in the direction of C-axis is less than 10 Å, an alkali metal such as lithium tends not to be easily intercalated by the carbon material.

The present invention can provide an alkali metal battery having a long cycle life, a low reaction voltage, and a large capacity by using as the negative electrode the above-mentioned carbon material having a satisfactory interplanar spacing which allows the occlusion and emission of the alkali metal such as lithium.

The value of Ip(002)/Io(002) of the carbon material for use in the conventionally known non-aqueous secondary battery using a lithium salt is more than 0.7 in many cases. In such a case, the carbon material usually has a specific surface area of 10 m²/g or less.

In contrast to this, in the present invention, it is preferable that the carbon material have an $Ip(002)/Io(002)$ value in the range of 0.7 to 0.95, an $Ip(10)/Io(10)$ value of 0.6 or less, a crystalline structure developed in the direction of C-axis, and a specific surface area of 30 $m^2/g$ or more. Therefore, the carbon material for use in the present invention is characterized in that the specific surface area thereof is remarkably larger than that of the carbon material conventionally used for the negative electrode. In the present invention, the specific surface area is measured by a BET method using nitrogen as an adsorption gas.

In view of the battery capacity and power density, it is preferable that the carbon material for use in the present invention have a specific surface area in the range of 30 to 500 $m^2/g$, more preferably in the range of 40 to 300 $m^2/g$, most preferably in the range of 100 to 300 $m^2/g$. When the specific surface area of the carbon material is 500 $m^2/g$ or more, the value of $Ip(002)/Io(002)$ decreases to less than 0.7, so that the electrode performance thereof tends to be degraded.

In the present invention, as the carbon material for use in the negative electrode for the battery, a carbon material obtained by calcining an organic polymer compound such as furan resin, phenol resin, cellulose resin, or polyacrylonitrile resin, and a carbon material obtained from a coal pitch or a petroleum pitch can be used. Of these, the carbon material obtained from a mesophase pitch is preferably used in the present invention because a carbon material having the previously mentioned crystalline structure can be easily derived from the mesophase pitch.

Although there is no specific limitation to the shape of the carbon material for use in the negative electrode, a fibrous carbon material is preferably used in the present invention. When the mesophase pitch is used as a starting material for producing the carbon material, a fibrous carbon material precursor with a high degree of orientation can be obtained. The fibrous carbon material having the previously mentioned crystalline structure can be obtained by calcining the above obtained fibrous carbon material precursor.

The mesophase pitch can be obtained by the following method:

A petroleum pitch of a residual carbon material is obtained as a by-product by fluid catalytic cracking of vacuum gas oil or thermal decomposition of naphtha. The obtained petroleum pitch is stirred in a gas current having no oxidative effect by the application of heat thereto at 360° to 450° C. under normal pressure or by the application of pressure thereto, whereby a pitch containing mesophase in an amount of 10 to 50% thereof is obtained. Then, this pitch is allowed to stand in a gas current having no oxidative effect at a lower temperature than the above-mentioned heat-treatment temperature, in the range of 280° to 350° C. The pitch is divided into an upper non-mesophase layer and a lower mesophase layer (both layers can be easily confirmed by a polarization microscope), whereby a 100% mesophase pitch consisting of a quinoline-insoluble component and a quinoline-soluble component is obtained.

In addition, the mesophase pitch can also be obtained from a coal pitch. However, it is preferable to use the carbon material using the mesophase pitch obtained from the petroleum pitch because it reduces the value of $Ip(10)/Io(10)$ and improves the electrode performance.

It is necessary to make the mesophase pitch infusible and carbonize it when the carbon material for use in the negative electrode is to be obtained from the mesophase pitch. As a method of making the mesophase pitch infusible, there are known a method of grinding the mesophase pitch and bringing the ground mesophase pitch into contact with an oxygen-containing gas such as air at 250° to 400° C., and a method of spinning the mesophase pitch at 250° to 400° C., and bringing the spun mesophase pitch into contact with an oxygen-containing gas such as air at 250° to 400° C. Either method can be used in the present invention. After the mesophase pitch is made infusible, it is subjected to carbonization by the application of heat thereto at 800° to 2500° C., preferably at 800° to 1500° C. When the carbonization temperature exceeds 1500° C., the value of $Ip(002)/Io(002)$ of the obtained carbon material tends to be more than 0.95, and the electrode performance thereof tends to decrease. The more preferable carbonization temperature is 900° to 1200° C.

The carbon material which has been subjected only to carbonization generally has a specific surface area of 10 $m^2/g$ or less. When the above carbon material is further subjected to an activation treatment, the specific surface thereof can be 30 $m^2/g$ or more. The activation treatment is carried out by exposing the carbon material to water vapor, carbon dioxide, or a combustion gas such as propane, at 800° C. or more, preferably at 900° C. or more. The activation time is generally about 5 to 120 minutes.

A fibrous carbon material is particularly preferable as the carbon material for use in the negative electrode for the battery of the present invention. In this case, it is preferable to use a carbon fiber with a circular cross-section, a fiber diameter of 5 $\mu m$ or more, preferably 5 to 30 $\mu m$, and an aspect ratio of 50 or less, preferably 1 to 20. In the case where a carbon fiber with a circular cross-section is obtained from the mesophase pitch, the mesophase pitch orients in the direction of the longitude of the fiber in the stretching process. Therefore, a carbon material with a highly preferable crystallizability for the intercalation of the alkali metal such as lithium, can be obtained by making the above mesophase pitch infusible and carbonizing it. Because the intercalation of the alkali metal tends to occur in the direction of the cross-section of the carbon fiber rather than in the direction of the longitude thereof, the fiber diameter and the aspect ratio of the carbon fiber are important. The carbon fiber with a fiber diameter and an aspect ratio in the above preferable range can satisfactorily intercalate the alkalimetal.

When the carbon fiber obtained from the mesophase pitch is ground to such a degree that the aspect ratio thereof becomes 50 or less, the specific surface area of the carbon fiber can be increased to 30 $m^2/g$ or more, without the activation treatment thereof. This is probably because in a higher order structure of the carbon fiber having a weak portion of the crystals, such as a radial structure, this weak portion forms minute cracks when the carbon fiber is ground. Because the specific surface area of the carbon fiber is increased; the carbon fiber can intercalate the alkali metal more sufficiently.

In order to improve the electroconductivity of the negative electrode for the battery of the present invention, it is preferable that the above-mentioned carbon material be mixed or compounded with finely-divided particles or fibers of a highly electroconductive material, for example, a metal such as Ni, Cu, or Ti, an alloy such as stainless steel, and graphite. Of these, graphite is particularly preferable for the improvement of the electroconductivity of the carbon material. In the present invention, it is preferable that the graphite with an interplanar spacing [d(002)] of 3.35 Å to 3.38 Å be mixed with the carbon material at a ratio of 3 to 50%, more preferably 5 to 40%, of the total weight of the carbon material in order to maintain the flatness of the potential of the negative electrode at discharging. The graphite for use in the present invention has an average diameter of 30 μm or less, preferably 20 μm or less. When the diameter of the graphite is in the above preferable range, the electrode has a satisfactory electroconductivity, and the carbon material can be easily processed to a sheet-shaped electrode. A battery using a negative electrode to which such an electroconductivity is imparted is superior to the conventional batteries in that the reduction in voltage is extremely small even when high-efficiency discharging is carried out, and has a high energy density and a long cycle life.

Either a plate-shaped electrode or a sheet-shaped electrode can be used as the negative electrode in the present invention. In view of the utilization of the negative electrode and processability thereof into the battery, the sheet-shaped electrode is more preferable than the plate-shaped one. When the carbon material is worked into the sheet-shaped electrode by a coating method, it is preferable that the carbon fiber have an aspect ratio of 50 or less, more preferably 1 to 20, most preferably 1 to 10. When the aspect ratio of the carbon fiber is in the above preferable range, this carbon fiber can be easily dispersed in a paint or slurry.

It is also preferable that an active material layer comprising the carbon material in the negative electrode have a thickness of 20 to 500 μm, more preferably 50 to 300 μm. When the thickness of the active material layer is less than 20 μm, the energy density of the negative electrode is low because of a collector in the negative electrode, and a uniform electrode cannot be easily obtained. On the other hand, when the thickness of the active material layer is above 500 μm, the utilization and flexibility of the negative electrode are reduced.

The sheet-shaped negative electrode comprising the carbon material can be obtained by mixing an appropriate binder with the carbon material, and by depositing the thus obtained mixture on the collector by coating, adhesion, or contact bonding.

As the binding agent, Teflon, for example, polyvinylidene fluoride, polyacrylonitrile, and polyethylene terephthalate can be used. Of these, Teflon and polyvinylidene fluoride are preferable, and polyvinylidene fluoride is more preferable.

In the case where polyvinylidene fluoride is used as the binder, the previously mentioned carbon material is dispersed in a solution prepared by dissolving polyvinylidene fluoride in a solvent such as N-methylpyrrolidone to prepare a paint. Then, the thus obtained paint is coated on a collector, and dried, whereby a sheet-shaped negative electrode is obtained. The drying temperature is 140° to 400° C., preferably 170° to 300° C. When the drying temperature is below 140° C., the self-supporting properties of the sheet-shaped negative electrode are not sufficient, and the cycle performance thereof is caused to deteriorate. On the other hand, when the drying temperature is above 400° C., polyvinylidene fluoride is decomposed, and the cycle performance of the negative electrode is also caused to deteriorate.

As the collector, an electroconductive foil consisting of a metal such as nickel, copper, or titanium, or an alloy such as stainless steel, a metal screen, a punching metal, and an expanded metal can be used. It is preferable to roughen the surface of the collector so as to increase the adhesion between the active material layer and the collector, reduce the internal resistance of the negative electrode, and improve the cycle life thereof. The negative electrode for use in the present invention can be worked into any shape for the application to coin-type, cylindrical-type, gum-type, and sheet-type batteries. Especially when the negative electrode is used in a sheet-type secondary battery, this negative electrode induces an excellent performance.

Any electrode active materials which are generally used in the lithium batteries, especially the secondary batteries, can be employed as a positive electrode material for use in the battery of the present invention.

As the positive electrode material, transition metal chalcogenite compounds, electroconductive polymers, carbon materials, and composites thereof can be used. Specific examples of the transition metal chalcogenite compound are oxides such as $V_2O_5$, $TiO_2$, $Cr_3O_8$, $MnO_2$, $MnO_3$, $CoO_2$, and $NiO_2$, sulfides such as $TiS_2$ and $FeS$, and composite oxides such as Li with Mn, Li with Ni, and Li with Co. Specific examples of the electroconductive polymer are polyaniline, polypyrrole, polythiophene, polyacetylene, polyazulene, polydiphenylbenzidine, polyvinylpyridine, and derivatives thereof such as poly-3-alkylthiophene. Of the above-mentioned materials, a material with a high degree of electric potential flatness is preferably used in the positive electrode.

In the non-aqueous secondary batteries of the present invention, the cycle life is largely affected by a balance between the combined positive electrode active material and negative electrode active material (carbon material). When the discharge capacity ratio of the positive electrode active material to the negative electrode active material (carbon material), which is represented by the ratio of discharge capacity of the positive electrode/discharge capacity of the negative electrode, is 1 or more, preferably 1.2 or more, more preferably 1.5 or more, the secondary battery with a long cycle life can be obtained.

There is no specific limitation to the kinds of electrolytes for use in the battery of the present invention. For instance, a salt of an alkali metal ion such as lithium ion, and an anion can be employed as the electrolyte. In this case, examples of the anion are $ClO_4^-$, $BF_4^-$, $SbF_6^-$, $AsF_6^-$, $PF_6^-$, $CF_3SO_3^-$, and $SCN^-$. Of the above anions, $PF_6^-$ and $BF_4^-$ are preferable when the discharge capacity, cycle life, and safety of the negative electrode are taken into consideration.

In the present invention, an organic polar solvent is used as an electrolytic liquid. An organic polar solvent having a non-protonic property and a high dielectric constant is preferably used.

Specific examples of the above organic polar solvent are as follows: propylene carbonate, ethylene carbonate, dimethyl carbonate, diethyl carbonate, γ-butyrolactone, sulfolane, dioxolan, tetrahydrofuran, 2-methyltetrahydrofuran, nitrobenzene, dimethylsulfoxide, dimethylformamide, and glymes such as 1,2-dimethoxyethane, methyldiglyme, methyltriglyme, methyltetraglyme, ethylglyme, ethyldiglyme, and butyldiglyme. When polypropylene carbonate or ethylene carbonate, and a low-viscosity solvent such as 1,2-dimethoxyethane are used in combination, the charging and discharging efficiency of the negative electrode can be raised to 90% or more.

The concentration of the electrolyte varies depending on the kinds of the positive electrodes, electrolytes, and organic non-aqueous polar solvents to be used in the batteries. Generally, the concentration of the electrolyte is in the range of 0.001 to 10 moles/liter, preferably 0.1 to 7 moles/liter, more preferably 2 to 5 moles/liter. The negative electrode for use in the present invention can increase the charging and discharging efficiency of the battery according to the present invention to 90% or more in an electrolyte concentration range higher than about 1 mole/liter which corresponds to the concentration of the electrolyte for use in the conventional lithium battery. Because the battery performance is caused to deteriorate by the presence of oxygen or water in the electrolytic salt or solvent, it is preferable that the electrolytic salt and solvent be purified so as to eliminate therefrom oxygen or water by a conventional procedure.

In the present invention, a separator can be used when necessary. It is preferable to use as the separator a material having a low resistivity with respect to the ion transfer in an electrolytic solution, and excellent liquid retaining properties. Examples of the separator are a glass fiber filter, a nonwoven fabric filter consisting of a polymer fiber made of, for example, polyester, Teflon, polyflon, or polypropylene, and a nonwoven fabric filter consisting of a glass fiber and the above-mentioned polymer fiber.

In the present invention, a solid electrolyte can be used instead of the above-mentioned electrolytic solution or the separator. Examples of an inorganic solid electrolyte for use in the present invention include $AgCl$, $AgBr$, $AgI$, $LiI$, $RbAg_4I_5$, and $RbAg_4I_4CN$. Examples of an organic solid electrolyte are as follows: a composite prepared by dissolving the above-mentioned electrolytic salt in a polymer matrix of polyethylene oxide, polypropylene oxide, polyvinylidene fluoride or polyacrylic amide, a gel-crosslinked composite thereof, a polymeric solid electrolyte prepared by grafting an ion dissociation group, for example, of a low-molecular-weight polyethylene oxide or crown ether to the main chain of a polymer, and a gel-polymeric solid electrolyte prepared by impregnating a polymer with the above-mentioned electrolytic solution. Of these, the gel-polymeric solid electrolyte is preferred because the negative electrode can be impregnated with the gel-polymeric solid electrolyte deep into the inside of the negative electrode, can be uniformly compounded with the carbon material, and can reduce the interfacial resistance between the electrode and the solid electrolyte. The negative electrode for use in the present invention does not produce any gases, works satisfactorily in the gel-polymeric solid electrolyte as well as in the electrolytic solution, and has a large discharge capacity and a long cycle life.

Other features of this invention will become apparent in the course of the following description of exemplary embodiments, which are given for illustration of the invention and are not intended to be limiting thereof.

REFERENCE EXAMPLE 1

[Preparation of Carbon Material]

A petroleum pitch fraction (initial boiling point: 404° C., end point: 560° C.) of a residual carbon material obtained as a by-product in the course of fluid catalytic cracking (FCC) of vacuum gas oil was heated to 400° C. for 2 hours with a recycle lower hydrocarbon gas being supplied thereto, and was further heated at 320° C. for 10 hours to age mesophase contained therein. Then, a mesophase pitch containing a minute inorganic solid material of fluid catalytic cracking catalysts was separated from the above aged material, and purified. The purified mesophase pitch was heated to 400° C. for 6 hours to prepare a 45.2% mesophase pitch. After further aging, a 100% mesophase pitch was isolated by viscosity thereof. The viscosity of the mesophase pitch is 108 poise at 308° C., and that of a non-mesophase pitch is 10 poise at the same temperature.

Then, the above obtained 100% mesophase pitch was subjected to melt spinning at 303° C. to prepare a filament yarn. This filament yarn was made infusible at 300° C., and was subjected to carbonization at 1000° C., so that a carbon fiber with a fiber diameter of 10 μm and a circular cross-section was obtained. The cross-section of this carbon fiber had a radial structure.

The specific surface area of the above obtained carbon fiber was measured with a Monosorb-type specific surface area measuring instrument made by Yuasa Ionics Corp. by a BET method using nitrogen as an adsorption gas. This carbon fiber had a specific surface area of 3.8 $m^2/g$.

The X-ray diffraction intensity curve of the above obtained carbon fiber was measured under the following conditions:

| | |
|---|---|
| Voltage | 45 kV |
| Electric Current | 40 mA |
| CuKα Line | λ = 1.5418 Å |
| Stepping Angle by Step | 0.020 deg |
| Scanning Technique in 2θ | |
| Scanning Speed | 4.000 deg/min |
| Divergent Slit | 1.00 deg |
| Scattering Slit | 1.00 deg |
| Receiving Slit | 0.30 mm |

The above obtained carbon fiber had a diffraction peak at 25.14° (=2θ). The interplanar spacing [d(002)] calculated from 2θ was 3.54 Å. The crystallite size in the direction of C-axis, which was measured from a half width of the X-ray diffraction intensity curve at the (002) plane, was 15 Å. The graphite-like crystalline structure parameters Ip(002)/Io(002) and Ip(10)/Io(10) were respectively 0.85 and 0.4.

A part of the above obtained carbon fiber was ground in a ball mill, so that a ground carbon fiber with an average fiber length of 300 μm and an aspect ratio of 30 was obtained. The specific surface area of this ground carbon fiber was measured with a Monosorb-type specific surface. area measuring instrument made by Yuasa Ionics Corp. This carbon fiber had a specific surface area of 45 $m^2/g$.

REFERENCE EXAMPLE 2

[Preparation of Carbon Material]

A part of the same carbon fiber as prepared in Reference Example 1, which had not been ground, was subjected to an activation treatment in a propane combustion gas at 980° C. for 30 minutes, so that an activated carbon fiber was obtained in a yield of 94%. The specific surface area of this activated carbon fiber was measured with a Monosorb-type specific surface area measuring instrument made by Yuasa Ionics Corp. This carbon fiber had a specific surface area of 38 $m^2/g$.

This carbon fiber was ground in a ball mill, so that a ground carbon fiber with an average fiber length of 50 μm and an aspect ratio of 5 was obtained. The specific surface area of this carbon fiber was 95 m$^2$/g.

The X-ray diffraction intensity curve of the above activated carbon fiber was also obtained.

EXAMPLE 1

9 parts by weight of the same ground carbon fiber as prepared in Reference Example 1 and 1 part by weight of Teflon particles were mixed. The obtained mixture was deposited on a 200-mesh SUS304 screen with the application of a pressure of 2 t/cm$^2$ thereto, so that a negative electrode for a lithium secondary battery was fabricated.

By using the above fabricated negative electrode as a working electrode, lithium as a counter electrode and a reference electrode, and an electrolyte prepared by dissolving 3.5M LiBF$_4$ in a 7:3 (by volume) mixed solvent of propylene carbonate and 1,2-dimethoxyethane, the discharge capacity of the active material of the negative electrode was measured, with charging the negative electrode at a constant potential for 5 hours, and then discharging it down to 2.5 V with the application of a constant current of 0.2 mA/cm$^2$. The results are shown in Table 1.

EXAMPLE 2

The procedure for preparing the carbon fiber in Reference Example 1 was repeated except that the conditions for spinning were changed, so that a carbon fiber with a fiber diameter of 20 μm and a circular cross-section was obtained. The cross-section of this carbon fiber had a radial structure. Then, this carbon fiber was ground in a ball mill, so that a ground carbon fiber with an average fiber length of 100 μm and an aspect ratio of 5 was obtained. The specific surface area of this ground carbon fiber was measured in the same manner as in Example 1. This carbon fiber had a specific surface area of 68 m$^2$/g.

Using the above obtained ground carbon fiber, a negative electrode for a secondary battery was fabricated, and the discharge capacity of the thus prepared negative electrode was measured in the same manner as in Example 1. The results are shown in Table 1.

EXAMPLE 3

9 parts by weight of the same ground carbon fiber as used in Example 1 and 1 part by weight of Teflon particles were mixed. The thus obtained mixture was deposited on a 200-mesh SUS304 screen with the application of a pressure of 2 t/cm$^2$ thereto, so that a negative electrode for a lithium secondary battery was fabricated.

By using the above fabricated negative electrode as a work electrode, lithium as a counter electrode and a reference electrode, and an electrolyte prepared by dissolving 3.5M LiClO$_4$ in a 7:3 (by volume) mixed solvent of propylene carbonate and 1,2-dimethoxyethane, the discharge capacity of the active material of the negative electrode was measured in the same manner as in Example 1. The results are shown in Table 1.

EXAMPLE 4

The procedure for fabricating the negative electrode and the measurement of the discharge capacity of the active material of the negative electrode in Example 2 were repeated except that the electrolyte employed in Example 2 was replaced by an electrolyte prepared by dissolving 3.5M LiClO$_4$ in a 7:3 (by volume) mixed solvent of propylene carbonate and 1,2-dimethoxyethane. The results are shown in Table 1.

EXAMPLE 5

The procedure for preparing the carbon fiber in Reference Example 1 was repeated except that the carbonization temperature was changed to 900° C., so that a ground carbon fiber with Ip(002)/Io(002) and Ip(10)/Io(10) as shown in Table 1, was obtained. The fiber diameter of this carbon fiber was 10 μm and the cross-section thereof had a radial structure before it was ground. The ground carbon fiber had an average fiber length of 300 μm and an aspect ratio of 30, Using the above obtained ground carbon fiber, a negative electrode for a secondary battery was fabricated and the discharge capacity of the active material of the negative electrode was measured in the same manner as in Example 1, The results are shown in Table 1.

EXAMPLE 6

A positive electrode was fabricated by depositing a mixture of LiCoO$_2$, a 20% graphite, and a 10% Teflon on a 200-mesh SUS304 screen with the application of a pressure of 2 t/cm$^2$ thereto.

By using the above fabricated positive electrode, the same negative electrode as fabricated in Example 3, and an electrolyte prepared by dissolving 3M LiClO$_4$ in a 7:3 (by volume) mixed solvent of propylene carbonate and 1,2-dimethoxyethane, an R2016 coin-type secondary battery of the present invention was fabricated. As a separator, a fine-porous polypropylene separator was used.

The discharge capacity of the above obtained battery was measured by use of a commercially available charge/discharge unit (made by Hokuto Denko Company, Ltd. under the trademark of "Hokuto Denko Charge/Discharge Unit HJ-201B") under the conditions of a voltage in the range of 3 to 4 V an a current of 0.5 mA. This battery had a discharge capacity of 15.4 mAh, and showed excellent cycle performance.

EXAMPLE 7

The procedure for fabricating the secondary battery in Example 6 was repeated except that a positive electrode was prepared by depositing a mixture of polyaniline and a 20% graphite on a 200-mesh SUS304 screen with the application of a pressure of 2 t/cm$^2$ thereto, so that an R2016 coin-type secondary battery of the present invention was obtained.

The discharge capacity of the thus obtained battery was measured by use of the same charge/discharge unit as employed in Example 6 under the conditions of a voltage in the range of 2 to 3.6 V and a current of 0.5 mA. This battery had a discharge capacity of 6.0 mAh, and showed excellent cycle performance.

EXAMPLE 8

A mixture of electrolytic manganese dioxide and lithium carbonate at a molar ratio of 7:1.5 was calcined at 400° C. This calcined product, a 20% graphite, and a 10% Teflon were mixed, and the thus obtained mixture was deposited on a 200-mesh SUS304 screen with the application of a pressure of 2 t/cm$^2$ thereto, so that a positive electrode was fabricated.

The procedure for fabricating the secondary battery in Example 6 was repeated except that the positive electrode employed in Example 6 was replaced by the above obtained positive electrode was used, so that an R2016 coin-type secondary battery of the present invention was fabricated.

The discharge capacity of the thus obtained battery was measured, with the charging and discharging conducted under the application of a voltage in the range of 2 to 3.6 V and a current of 0.5 mA. This battery had a discharge capacity of 17.9 mAh, and showed excellent cycle performance.

EXAMPLE 9

The same ground carbon fiber as used in Example 1 was calcined at 2500° C., so that graphite particles were obtained. The thus obtained graphite particles had a specific resistivity of $6 \times 10^{-4}$ Ω.cm and an interplanar spacing [d(002)] of 3.37 Å. Considering that the carbon fiber used in Example 1 had a specific resistivity of $1 \times 10^{-2}$ Ω.cm, the electroconductivity of the above obtained graphite particles was remarkably improved. Using a mixture of the above obtained graphite particles serving as an electroconductivity improver, the same carbon material as used in Example 1, and Teflon particles at a ratio of 2:7:1, a negative electrode was fabricated in the same manner as in Example 1.

The procedure for fabricating the secondary battery in Example 6 was repeated except that the electrolyte employed in Example 6 was replaced by an electrolyte prepared by dissolving 2M $LiPF_6$ in a 1:1 (by volume) mixed solvent of ethylene carbonate and 1,2-dimethoxyethane, so that an R2016 coin-type secondary battery of the present invention was fabricated.

The discharge capacity of the thus obtained battery was measured, with the charging and discharging conducted under the application of a voltage in the range of 3 to 4 V and a current of 0.5 mA. This battery had a discharge capacity of 16.5 mAh, and the discharge capacity at a discharge current of 1 mA was 16.0 mAh. This secondary battery showed excellent cycle performance.

EXAMPLE 10

The procedure for fabricating the secondary battery in Example 7 was repeated except that the same negative electrode as prepared in Example 9, and an electrolyte prepared by dissolving 3.5M $LiBF_4$ in an 6:4 (by volume) mixed solvent of propylene carbonate and 1,2-dimethoxyethane were used so that an R2016 coin-type secondary battery of the present invention was fabricated.

The discharge capacity of the thus fabricated battery was measured, with the charging and discharging conducted under the application of a voltage in the range of 2 to 3.6 V and a current of 0.5 mA. This battery had a discharge capacity of 7.0 mAh, and the discharge capacity at a discharge current of 1 mA was 6.7 mAh. This secondary battery showed excellent cycle performance.

EXAMPLE 11

The procedure for preparing the carbon fiber in Reference Example 1 was repeated except that the conditions for spinning were changed, so that a carbon fiber with a fiber diameter of 8 μ was obtained. Then, this carbon fiber was ground in an automatic mortar, so that a ground carbon fiber with an average fiber length of 32 μm and an aspect ratio of 4 was obtained. This ground carbon fiber had Ip(002)/Io(002) of 0.85 and Ip(10)/Io(10) of 0.4. The interplanar spacing [d(002)] of this carbon fiber was 3.54 Å, the crystallite size in the direction of C-axis thereof was 15 Å, and the specific surface area thereof was 69 $m^2/g$.

The above obtained ground carbon fiber, polyvinylidene fluoride, and N-methylpyrrolidone were mixed at a ratio of 9:1:9, and stirred to prepare a paint. This paint was coated on one side of a copper foil with a thickness of 18 μm, which was abraded by an emery paper, and dried at 200° C., so that a negative electrode with a size of 5 cm × 5 cm was fabricated. Using an aqueous solution of 1M aniline and 1M, $HBF_4$, and a SUS304 foil serving as an electrode, a polyaniline positive electrode with a size of 5 cm × 5 cm was fabricated by an electrolytic polymerization method.

75 g of methoxypolyethylene glycol monoacrylate (Trademark "AM-90G", made by Shin-Nakamura Chemical Co., Ltd.), 25 g of polyethylene glycol dimethacrylate (Trademark "9G", made by Shin-Nakamura Chemical Co., Ltd.), 20 g of $LiBF_4$, 100 g of propylene carbonate, and 0.4 g of 2,2-dimethoxy-2-phenylacetophenone were mixed to prepare a uniform solution. Each of the above obtained positive electrode and negative electrode, and a separator of fine-porous polypropylene was impregnated with this solution. Each of the thus impregnated positive electrode, negative electrode, and separator was interposed between glass plates, and an active light was applied thereto by a super high-pressure mercury lamp, so that a polymer solid electrolyte was compounded. Then, the positive electrode, negative electrode, and separator were laminated, whereby a sheet-shaped secondary battery of the present invention with a size of 0.5 mm × 5.4 cm × 5.4 cm was fabricated. As a sheathing material for this battery, an aluminum/modified polypropylene laminate film was used.

The discharge capacity of the thus obtained battery was measured, with the charging and discharging conducted under the application of a voltage in the range of 2 to 3.7 V and a current of 1 mA. This battery had a discharge capacity of 16.1 mAh. The cycle life of this battery was more than 500 in terms of the charging and discharging cycle.

EXAMPLE 12

9 parts by weight of the same activated, ground carbon fiber as prepared in Reference Example 2 and 1 part by weight of Teflon particles were mixed. The thus obtained mixture was deposited on a 200-mesh SUS304 screen with the application of a pressure of 2 $t/cm^2$ thereto, so that a negative electrode for a lithium secondary battery was obtained.

Using the above obtained negative electrode as a working electrode, lithium as a counter electrode and a reference electrode, and an electrolyte prepared by dissolving 3.5M $LiBF_4$ in a 7:3 (by volume) mixed solvent of propylene carbonate and 1,2-dimethoxyethane, the discharge capacity of the active material of the negative electrode was measured, with charging the negative electrode at a constant electric potential for 5 hours, and then discharging it down to 2.5 V with the application of a constant current of 0.2 $mA/cm^2$. The results are shown in Table 1.

EXAMPLE 13

The procedure for preparing the carbon fiber in Reference Example 2 was repeated except that the activation time was changed to 60 minutes, so that an activated, ground carbon fiber with a specific surface area of 125 m$^2$/g was obtained. By using this carbon fiber, a negative electrode was fabricated and the discharge capacity thereof was measured in the same manner as in Example 12. The results are shown in Table 1.

EXAMPLE 14

9 parts by weight of the same activated, ground carbon fiber as used in Example 12 and 1, part by weight of Teflon particles were mixed. The thus obtained mixture was deposited on a 200-mesh SUS304 screen with the application of a pressure of 2 t/cm$^2$ thereto, so that a negative electrode for a lithium secondary battery was fabricated.

By using the above fabricated negative electrode as a work electrode, lithium as a counter electrode and a reference electrode, and an electrolyte prepared by dissolving 3.5M LiClO$_4$ in a 7:3 (by volume) mixed solvent of propylene carbonate and 1,2-dimethoxyethane, the discharge capacity of the active material of the negative electrode was measured in the same manner as in Example 12. The results are shown in Table 1.

EXAMPLE 15

The procedure for fabricating the negative electrode and the measurement of the discharge capacity thereof in Example 13 were repeated except that the electrolyte employed in Example 13 was replaced by an electrolyte prepared by dissolving 3.5M LiCO$_4$ in a 7:3 (by volume) mixed solvent of propylene carbonate and 1,2-dimethoxyethane. The results are shown in Table 1.

EXAMPLE 16

The procedure for preparing the carbon fiber in Reference Example 2 was repeated except that the activation temperature and activation time were respectively changed to 1000° C. and 90 minutes, so that an activated carbon fiber with a specific surface area of 220 m$^2$/g was obtained. By using this carbon fiber, a negative electrode was fabricated and the discharge capacity thereof was measured in the same manner as in Example 12, The results are shown in Table 1.

EXAMPLE 17

A positive electrode was fabricated by depositing a mixture of LiCoO$_2$, a 20% graphite, and a 10% Teflon on a 200-mesh SUS304 screen with the application of a pressure of 2 t/cm$^2$ thereto.

By using the above fabricated positive electrode, the same negative electrode as fabricated in Example 12, and an electrolyte prepared by dissolving 3M LiClO$_4$ in a 7:3 (by volume) mixed solvent of propylene carbonate and 1,2-dimethoxyethane, an R2016 coin-type secondary battery of the present invention was fabricated. As a separator, a fine-porous polypropylene separator was used.

The discharge capacity of the above obtained battery was measured, with the charging and discharging conducted under the application of a voltage in the range of 2 to 3.6 V and a current of 0.5 mA. This battery had a discharge capacity of 22.3 mAh, and showed excellent cycle performance.

EXAMPLE 18

The procedure for fabricating the secondary battery in Example 17 was repeated except that the positive electrode employed in Example 17 was replaced by a positive electrode fabricated by depositing a mixture of polyaniline and a 20% graphite on a 200-mesh SUS304 screen with the application of a pressure of 2 t/cm$^2$ thereto, so that an R2016 coin-type secondary battery of the present invention was fabricated.

The discharge capacity of the thus fabricated battery was measured, with the charging and discharging conducted under the application of a voltage in the range of 2 to 3.6 V and a current of 0.5 mA. This battery had a discharge capacity of 8.5 mAh, and showed excellent cycle performance.

EXAMPLE 19

A mixture of electrolytic manganese dioxide and lithium carbonate at a molar ratio of 7:1.5 was calcined at 400° C. This calcined product, a 20% graphite, and a 10% Teflon were mixed, and the thus obtained mixture was deposited on a 200-mesh SUS304 screen with the application of a pressure of 2 t/cm$^2$ thereto, so that a positive electrode was fabricated.

The procedure for fabricating the secondary battery in Example 17 was repeated except that the positive electrode employed in Example 17 was replaced by the above obtained positive electrode, so that an R2016 coin-type secondary battery of the present invention was obtained.

The discharge capacity of the thus obtained battery was measured, with the charging and discharging conducted under the application of a voltage in the range of 2 to 3.6 V and a current of 0.5 mA. This battery had a discharge capacity of 25.3 mAh, and showed excellent cycle performance.

COMPARATIVE EXAMPLE 1

The same ground carbon fiber as used in Example 1, with Ip(002)/Io(002)=0.85, Ip(10)/Io(10)=0.4, d(002)=3.54 Å, Lc(002)=15 Å, specific surface area=45 m$^2$/g, was carbonized again with the application of heat thereto at 1500° C. Because of the elevation of the carbonization temperature, the specific surface area of this carbon fiber was reduced to 8 m$^2$/g. By using this carbon fiber, a negative electrode for a secondary battery was fabricated and the discharge capacity thereof was measured in the same manner as in Example 1. The results are shown in Table 1.

COMPARATIVE EXAMPLE 2

A coal tar heated to 150° C. was filtered through a filter under the application of pressure, so that a primary quinoline-soluble component was removed from the coal tar to obtain a purified tar. The thus obtained purified tar was subjected to vacuum distillation, and low-boiling-point components were removed therefrom, so that a pitch was obtained. 500 g of the thus obtained pitch was placed in a one-liter autoclave, and heated to 350° C. for 2 hours with air blown thereinto at a rate of 10 liter/min., whereby a non-mesophase pitch having a softening point of 298° C. was obtained.

The above obtained non-mesophase pitch was subjected to melt spinning at 340° C. to obtain a fiber. Then, the thus obtained fiber was successively made infusible at 290° C., ground, and carbonized at 1500° C., whereby a carbon fiber having a fiber diameter of 10 μm and an aspect ratio of 30 was obtained. The values of Ip(002)/Io(002) and Ip(10)/Io(10) of this carbon fiber are shown in Table 1.

Using the above obtained carbon fiber, a negative electrode for a secondary battery was fabricated in the same manner as in Example 1. Then, the discharge capacity of the thus fabricated negative electrode was measured in the same manner as in Example 1 except that LiClO$_4$ was used as an electrolyte. The results are shown in Table 1.

the cycle life thereof was 25 in terms of the charging and discharging cycle.

TABLE 1

| | Ex. 1 | Ex. 2 | Ex. 3 | Ex. 4 | Ex. 5 | Ex. 12 | Ex. 13 | Ex. 14 | Ex. 15 | Ex. 16 | Comp. Ex. 1 | Comp. Ex. 2 | Comp. Ex. 3 |
|---|---|---|---|---|---|---|---|---|---|---|---|---|---|
| Material | MP | MP | MP | MP | MP | MP | MP | MP | MP | MP | MP | NMP | NMP |
| Carbonization Temperature (°C.) | 1000 | 1000 | 1000 | 1000 | 1000 | 1000 | 1000 | 1000 | 1000 | 1000 | 1500 | 1500 | 1500 |
| Activation Temperature (°C.) | — | — | — | — | — | 980 | 980 | 980 | 980 | 980 | — | — | — |
| Activation Gas | — | — | — | — | — | Combustion Gas | Same as Left | Same as Left | Same as Left | Same as Left | — | — | — |
| Activation Time (min.) | — | — | — | — | — | 30 | 60 | 30 | 60 | 90 | — | — | — |
| Structure of Carbon Material | | | | | | | | | | | | | |
| d(002)(Å) | 3.54 | 3.54 | 3.54 | 3.54 | 3.58 | 3.50 | 3.49 | 3.50 | 3.49 | 3.48 | 3.46 | 3.49 | 3.43 |
| Lc(002)(Å) | 15 | 15 | 15 | 15 | 11 | 14 | 12 | 14 | 12 | 10 | 44 | 10 | 30 |
| $I_p(002)/I_o(002)$ | 0.85 | 0.85 | 0.85 | 0.85 | 0.86 | 0.82 | 0.78 | 0.82 | 0.78 | 0.75 | 0.98 | 0.73 | 0.9 |
| $I_p(10)/I_o(10)$ | 0.4 | 0.4 | 0.4 | 0.4 | 0.5 | 0.3 | 0.2 | 0.3 | 0.2 | 0.2 | 0.5 | 0.57 | 0.76 |
| Fiber Diameter (μm) | 10 | 20 | 10 | 20 | 10 | 10 | 10 | 10 | 10 | 10 | 10 | 10 | 10 |
| Aspect Ratio | 30 | 5 | 30 | 5 | 30 | 5 | 5 | 5 | 5 | 5 | 30 | 30 | 30 |
| Specific Surface Area (m$^2$/g) | 45 | 68 | 45 | 68 | 39 | 95 | 125 | 95 | 125 | 220 | 8 | 4 | 3 |
| Energy Density | | | | | | | | | | | | | |
| 0.3 V vs Li/Li$^+$ (mAh/g) | 113 | 131 | 112 | 119 | 120 | 167 | 191 | 175 | 194 | 159 | 42 | 35 | 23 |
| 0.2 V vs Li/Li$^+$ (mAh/g) | 129 | 142 | 129 | 144 | 141 | 192 | 215 | 198 | 221 | 186 | 57 | 42 | 31 |
| 0.1 V vs Li/Li$^+$ (mAh/g) | 155 | 181 | 155 | 180 | 172 | 224 | 243 | 227 | 249 | 218 | 68 | 51 | 39 |
| Electrolyte | LiBF$_4$ | LiBF$_4$ | LiClO$_4$ | LiClO$_4$ | LiBF$_4$ | LiBF$_4$ | LiBF$_4$ | LiClO$_4$ | LiClO$_4$ | LiBF$_4$ | LiBF$_4$ | LiClO$_4$ | LiClO$_4$ |

MP denotes Mesophase pitch; and NMP denotes Non-mesophase pitch.

COMPARATIVE EXAMPLE 3

The procedure for preparing the carbon fiber consisting of the non-mesophase pitch in Comparative Example 2 was repeated except that the carbonization temperature was changed to 2000° C., whereby a carbon fiber having the values of Ip(002)/Io(002) and Ip(10)/Io(10) as shown in Table 1, was obtained.

Using the above obtained carbon fiber, a negative electrode for a secondary battery was fabricated and the discharge capacity of the thus fabricated negative electrode was measured in the same manner as in Comparative Example 2. The results are shown in Table 1.

COMPARATIVE EXAMPLE 4

A needle coke made from coal (Trademark "LPC-U", made by Nippon Steel Chemical Co., Ltd) was ground, so that coke particles with an average particle diameter of 30 μm were obtained. This needle coke had an interplanar spacing [d(002)] of 3.46 Å, a crystallite size [Lc(002)] of 45 Å, Ip(002)/Io(002) of 0.96, Ip(10)/Io(10) of 0.3, and a specific surface area of 4 m$^2$/g.

A sheet-shaped secondary battery was fabricated in the same manner as in Example 11 except that the carbon fiber employed in Example 11 was replaced by the needle coke. The discharge capacity of the thus obtained battery was measured, with the charging and discharging conducted under the application of a voltage in the range of 2 to 3.7 V and a current of 1 mA. This battery had a discharge capacity of 13.7 mAh, and the cycle life thereof was 25 in terms of the charging and discharging cycle.

The present invention provides a non-aqueous battery using a non-aqueous electrolyte comprising an alkali metal salt dissolved as an electrolytic salt in an organic non-aqueous polar solvent, and comprising a negative electrode which comprises a carbon material with a graphite-like crystalline structure parameter Ip(002)/Io(002) at a diffraction peak at the (002) plane of an X-ray diffraction intensity curve being in the range of 0.7 to 0.95, and with a graphite-like crystalline structure parameter Ip(10)/Io(10) at a diffraction peak at the (10) plane of an X-ray diffraction intensity curve being 0.6 or less. Because of its extremely low self discharge properties, large charge and discharge capacity, good charging and discharging cycle performance, and excellent rapid charging and discharging performance, the non-aqueous battery of the present invention is particularly useful as the secondary battery.

What is claimed is:

1. A non-aqueous secondary battery using a non-aqueous electrolyte comprising an alkali metal salt dissolved as an electrolytic salt in an organic polar solvent, comprising a negative electrode which comprises a carbon material with a graphite-like crystalline structure parameter Ip(002)/Io(002) at a diffraction peak at the (002) plane of an X-ray diffraction intensity curve being in the range of 0.7 to 0.95, and with a graphite-like crystalline structure parameter Ip(10)/Io(10) at a diffraction peak at the (10) plane of an X-ray diffraction intensity curve being 0.6 or less.

2. The non-aqueous secondary battery as claimed in claim 1, wherein said carbon material has an interplanar spacing [d(002)] at (002) plane in the range of 3.42 Å to 3.70 Å, and a crystallite size [Lc(002)] in the direction of C-axis in the range of 10 Å to 70 Å.

3. The non-aqueous secondary battery as claimed in claim 1, wherein said carbon material has a specific surface area of 30 m$^2$/g or more.

4. The non-aqueous secondary battery as claimed in claim 1, wherein said carbon material is a mesophase-pitch-derived carbon material.

5. The non-aqueous secondary battery as claimed in claim 1, wherein said carbon material is a fibrous carbon material.

6. The non-aqueous secondary battery as claimed in claim 5, wherein said fibrous carbon material has a fiber diameter of 5 μm or more, and an aspect ratio of 50 or less.

7. The non-aqueous secondary battery as claimed in claim 1, wherein the concentration of said alkali metal dissolved in said organic polar solvent is in the range of 2 to 5 moles/liter.

8. The non-aqueous secondary battery as claimed in any of claims 1 to 7, wherein said negative electrode further comprises graphite which is mixed with said carbon material.

9. The non-aqueous secondary battery of claim 1, wherein the positive electrode material of the positive electrode of said battery is a transition metal chalcogenite compound, an electroconductive polymer, a carbon material or combinations thereof.

10. The non-aqueous secondary battery of claim 9, wherein said transition metal chalcogenite compound is an oxide which is $V_2O_5$, $TiO_2$, $Cr_3O_8$, $MnO_2$, $MnO_3$, $CoO_2$, $NiO_2$, a sulfide which is $TiS_2$ or FeS; or a composite oxide of an oxide of Li with Mn, Li with Ni or Li with Co; and said electroconductive polymer is a polyaniline, polypyrrole, polythiophene, polyacetylene, polyazulene, polydiphenylbenzidine, polyvinylpyridine or derivatives thereof.

* * * * *

UNITED STATES PATENT AND TRADEMARK OFFICE
CERTIFICATE OF CORRECTION

PATENT NO. : 5,436,092
DATED : July 25, 1995
INVENTOR(S) : Kiyoto Ohtsuka et al.

It is certified that error appears in the above-indentified patent and that said Letters Patent is hereby corrected as shown below:

Column 6:     line 59, "is increased; the carbon"
   should read        --is increased, the carbon--.

Column 11:    line 4, "of this: carbon fiber"
   should read        --of this carbon fiber--.

Column 12:    line 14, "30, Using"
   should read        --30. Using--;

line 19, "as in Example 1, The"
   should read        --as in Example 1. The--;

line 39, "to 4 V an a current"
   should read        --to 4 V and a current--.

Signed and Sealed this

Sixteenth Day of July, 1996

Attest:

BRUCE LEHMAN

*Attesting Officer*     *Commissioner of Patents and Trademarks*